Patented Dec. 5, 1939

2,182,304

UNITED STATES PATENT OFFICE 2,182,304

COATING PROCESS

Clifford Jay Rolle, Yonkers, N. Y., assignor to Interchemical Corporation, New York, N. Y., a corporation of Ohio No Drawing. Application August 28, 1936,
Serial No. 98,337

3 Claims. (Cl. 113—120)

This invention relates to the manufacture of coated metal articles, and more particularly to the manufacture of tin cans lined with two or more thin coats of resin compositions or the like.

The purpose of lining cans or metal food containers is, of course, to form a durable, impermeable coating which will prevent the contents of the containers from coming in contact with the metal. When the lining consists of more than one coat, the top-coat should bond with the under-coat.

In making multi-coated containers, it is often desirable to apply the first coat, then bend the coated metal into the desired shape, and thereafter apply the top-coat. In shaping the metal, the dies and other machinery tend to damage the applied coating, which is fragile.

A feature of the present invention accordingly resides in the provision of a coating process involving the application to the under-coat, before the top-coat is applied, of a preparation which cooperates in the production of a superior composite coating, and which is also capable of serving as a lubricant, for preventing damage to the under-coat, when the metal is formed or shaped subsequent to the application of the under-coat.

I have found that the preparation which is applied to the under-coat, for present purposes, must satisfy a number of varied and seemingly conflicting requirements. For one thing, it must be a non-solvent, or have very limited solvent power, for the under-coat, so that it does not impair the latter; it must permit the over-coat to adhere firmly to the under-coat, and assist in producing a uniform spread and flow of the over-coating composition; it should wet the surface to which the top-coat is applied, so that the surface receives a uniform amount of composition tending to form a continuous thin film; and any portions of the preparation which remain on the first coat when the second coat is applied must be such that they do not cause blistering of the composite film when the coated article is baked to harden the resins. Moreover, the preparation which is applied between the films should not be excessively viscous or thick, and should not have a tendency to unbalance the formula of the top-coat. On the other hand, the preparation should be miscible with the composition of the top-coat. It is also important that the preparation should be non-hygroscopic, for free water injures the top-coat. And it is also highly desirable that the composition be inexpensive, and easy to apply.

When the preparation must also serve as a lubricant, i. e., when the under-coat is applied prior to the shaping of the metal articles, it should be capable of lubricating the surface, as well as tending to form a continuous film where applied, so as to minimize damage to the under-coat by the dies or machinery employed to bend the metal into the desired shape, and it should be able to withstand the high temperatures developed incident to the repeated operation of these dies.

I have found that excellent results are obtainable by coating the article, applying to the coated surface a composition containing a small proportion of non-volatile plasticizer which is water repellant, and then applying a resin composition which is compatible with the plasticizer. According to the preferred practice of my invention, the non-volatile plasticizer is employed in the form of a water emulsion, in which the water constitutes the external phase of the emulsion, the emulsion being sufficiently stable for use as a lubricant, and yet permitting evaporation of the water prior to the application of the over-coat.

More specifically, the under-coat is first applied to the article to be coated, and the film formed is allowed to set to a condition in which it is no longer fluid. Normally, it is baked and in the case of some under-coats the resin is converted to the "C" stage. Then there is applied to or sprayed upon the coated surface a small quantity of an emulsion containing a non-hygroscopic, water-immiscible plasticizer, which is miscible with the composition of the over-coat, and which preferably has some solvent power for the resin of this composition, the water being next allowed to evaporate from the emulsion. The emulsifying agent employed preferably evaporates with the water. Heat may be applied, if desired, to expedite the evaporation of the water, and this heat may be provided by the dies which form the metal, when the article is shaped after the application of the under-coat. Thereupon, the over-coat may be directly applied to the under-coat on the surface of which the plasticizer remains, without the need for removal of the latter, and with the advantage of securing a superior composite coating. The coated article may then be again baked.

By way of a specific example illustrating my invention, there may first be applied to the surface to be coated, a resin composition of the type disclosed in co-pending application of Frishkorn and Wahl, Serial No. 35,066, filed August 7, 1935, and disclosing a mixture of an oil-free, phenol-formaldehyde resin which is insolubilizable by heat, an alkyd resin plasticizer such as a "Glyptal" resin made by General Electric Company, and suitable solvents. However, other similar compositions may be employed, and indeed lacquers and the like may be substituted for the resin film in some cases.

A satisfactory composition or lubricant for application to the under-coat includes the following ingredients:

| | Parts by volume |
|---|---|
| Water repellent plasticizer (butyl cellosolve stearate) | 32 |
| Emulsifier (morpholine) | 1 |
| Water | 95 |

However, various other plasticizers, such as triethanolamine oleate, butyl cellosolve phthalate and butyl phthalyl butyl glycolate, having the characteristics mentioned, may be used. It is advantageous that the plasticizer have a surface tension which is less than about 40 dynes per square centimeter, and preferably in the order of 30 to 35 dynes per square centimeter. In other words, the lubricant composition should have a surface tension such that it tends to form a continuous film on those portions of the surface to which it is applied. In order to produce a stable emulsion, it is advantageous that the specific gravity of the plasticizer be less than, or not markedly greater than, the specific gravity of water. I prefer to employ a plasticizer having a specific gravity of less than about 1.1. Other emulsifiers may be employed, and the mixture may be diluted with as much as seven volumes of water per volume of the above composition.

The coated metal, treated with a lubricant of this character, if it has not previously been bent to shape, may now be fed to the dies which form or shape it. As mentioned, these dies generate considerable heat, and this heat serves to partially or wholly vaporize the water from the emulsion.

The top-coat may next be applied to the article, without the need for removing the lubricant from the surface of the under-coat. An excellent formula for the top-coat is as follows:

| | Parts by weight |
|---|---|
| Resin ("Vinyloid H.") | 12 |
| Plasticizer (dibutyl cellosolve phthalate) | 2 |
| Solvents (methyl ethyl ketone) | 43 |
| Toluol | 43 |
| Total | 100 |

"Vinyloid H." is a vinyl resin which is understood to be produced by polymerization of vinyl compounds such as vinyl acetate and vinyl chloride. While I have found that particularly satisfactory results are obtainable with the use of phenol formaldehyde resins in the under-coat and vinyloid resins in the top-coat, the invention in its broader aspects is not restricted to the use of different types of resins in the different coats.

The terms and expressions which have been employed are used as terms of description and not of limitation, and there is no intention, in the use of such terms and expressions, of excluding any equivalents of the features shown and described, or portions thereof, but it is recognized that various modifications are possible within the scope of the invention claimed.

What I claim is:

1. The method of making an article coated with a resin composition, which comprises applying to a surface of the article an emulsion containing a resin plasticizer which is miscible and compatible with said resin composition, and a volatile liquid which constitutes the external phase of said emulsion, bending said article while furnishing heat thereto, thereby vaporizing said liquid, and applying said resin composition to the surface on which said plasticizer remains.

2. In a method of manufacturing multi-coated metal articles, such as tin cans, the steps which comprise lubricating a coated blank, prior to the application of the overcoat, with an aqueous liquid containing a small proportion of a non-volatile plasticizer which is compatible with the composition of the overcoat, shaping the blank under the lubricating action of said liquid and with the application of heat to the blank, thereby to evaporate the water and leave the non-volatile plasticizer, and subsequently applying the overcoat while the plasticizer remains on the blank.

3. In the method of manufacturing multi-coated metal articles, such as tin cans, the steps which comprise lubricating a coated blank, prior to the application of the overcoat, with an aqueous emulsion having the water in the external phase and containing a small proportion of a non-volatile plasticizer which is compatible with the composition of the overcoat, shaping the blank under the lubricating action of said liquid and with the application of heat to the blank, thereby to evaporate the water and leave the non-volatile plasticizer, and subsequently applying the overcoat while the plasticizer remains on the blank.

CLIFFORD JAY ROLLE.